United States Patent [19]
West et al.

[11] Patent Number: 5,617,548
[45] Date of Patent: Apr. 1, 1997

[54] METHOD OF INTERACTING WITH COMPUTER GRAPHICS

[75] Inventors: Joseph B. West; Charles A. Clinton, both of Woodinville, Wash.

[73] Assignee: Landmark Graphics Corporation, Houston, Tex.

[21] Appl. No.: 393,252

[22] Filed: Feb. 23, 1995

Related U.S. Application Data

[63] Continuation of Ser. No. 955,586, Dec. 1, 1992, abandoned.

[51] Int. Cl.$^6$ ............................................... G06F 3/100
[52] U.S. Cl. .......................... 395/326; 395/157; 395/340
[58] Field of Search .................................. 395/119, 127, 395/133–141, 147, 152, 157, 159, 155; 345/122, 115

[56] References Cited

U.S. PATENT DOCUMENTS

| | | | |
|---|---|---|---|
| 4,760,390 | 7/1988 | Maine et al. | 345/115 |
| 5,307,449 | 4/1994 | Kelley et al. | 395/119 |
| 5,315,692 | 5/1994 | Hansen et al. | 395/119 |

OTHER PUBLICATIONS

Schildt, "Using Turbo C + +", 1990, pp. 24, 25, 405, 406,421–431, 469–471.

Microsoft Corp., "Microsoft Windows User's Guide", 1990, pp. (xi,xii,18,41,42).

Ralph Roberts, "The First Book of Microsoft Publisher", 1992, pp. 205–206.

*Primary Examiner*—Heather R. Herndon
*Assistant Examiner*—Cliff N. Vo
*Attorney, Agent, or Firm*—Bush, Moseley, Riddle & Jackson, L.L.P.

[57] ABSTRACT

The invention is a system for interacting with computer graphics. A scene display is generated in response to a list which includes data related to computer generated objects which are to be included in a scene display and ad application program identifier for the application programs which are the source of each computer generated object. An object in the scene is manipulated by a user command and at least one interrogation command is generated which interrogates the list to retrieve data relating to each object affected by the manipulation and an application program identifier related to each application program which is the source of an object affected by the manipulation. The data related to the objects affected by the manipulation and the application program identifier are transmitted to each application program which is a source of an object affected by the manipulation. Additional steps as are required are performed by the application programs.

8 Claims, 3 Drawing Sheets

METHOD OF INTERACTING WITH COMPUTER GRAPHICS

This is a continuation of application Ser. No. 07/955,586, filed Dec. 1, 1992, abandoned.

BACKGROUND OF THE INVENTION

1. Field of the Invention

The present invention relates to methods of interacting and manipulating computer graphics and more particularly, the present invention relates to methods of interacting and manipulating, via display screen initiated instructions, displayed 3-dimensional (3-D) computer graphics. Still more particularly, the present invention relates to interacting and manipulating, via display screen initiated instructions, 3-D computer graphics displayed in a common visualization framework, wherein such 3-D computer graphics are independently rendered therein by a plurality of independent application programs.

2. Brief Description of the Prior Art

Generally, computer graphics interaction and manipulation occurs by a graphic system response to an screen input instruction. Such screen input instructions may be selected and initiated by a user with the aid of an input instruction means, such as a mouse-controlled cursor or light pen. In such instances where a cursor is used, the cursor, which may appear on the screen as an arrow, cross or other similar images, is positioned over the computer graphic object of interest followed by a selected key stroke specific to a desired instruction. This procedure for initiating screen input instructions is sometimes referred to as "point and click".

Traditionally, computer graphic systems suitable for such point and click instructions generally may be grouped as either 2-dimensional or 3-dimensional graphic systems. 2-Dimensional graphic systems generally display computer generated objects in length and width dimensions only, while 3-dimensional graphic systems generally display computer generated objects in length, width and depth dimensions. More advanced 3-dimensional graphic systems may enable the user to selectively rotate displayed computer generated objects so that such objects may be viewed from a plurality of perspectives.

Generally, in the operation of a 2-dimensional (2-D) graphic system, traditional 2-D graphics systems utilize a plurality of application programs for displaying 2-D computer generated objects. Each application program generally is responsible for a distinct rectangular display space which spatially defines a distinct 2-D computer generated object.

However, such 2-D systems have two distinct disadvantages. First, these 2-D systems generally occlude, as opposed to merge, rectangular display space(s) overlaid by other rectangular display space(s). Second, these 2-D systems do not permit the manipulation of the computer generated object within its assigned rectangular display space.

For example, FIG. 1, illustrates a schematic flow chart of a 2-D window graphics system 100. The system 100 includes a first application program (AP') 102 and a second application program (AP") 103. AP' 102 is ultimately responsible for image "A" appearing on screen 118. A" 103 is ultimately responsible for image "B" appearing on screen 118.

When a display command is initiated to display images A and B on screen 118, inputs, via conduits 104 and 106 from AP' 102 and A" 103 respectively, are communicated to the window server 108. The window server 108 preforms at least two functions. First, the window server assigns discrete rectangular spaces (110 and 112) for a computer generated object (CGO) of A and B. Second, the window server generates a List 114.

List 114 associates the 2-D extent of the displayed CGO data of A and B with their respective APs by correlating respective CGO data with corresponding application program identifiers. In this case, the association is between CGO data for image A and the application program identifier for AP' 102, and CGO data for image B and the application program identifier for A" 103. As illustrated in List 114, the 2-D extent of CGO data for images A and B are stored as complete rectangles.

Graphics generation instructions from the window server 108 are relayed via conduit 116 to screen 118. Screen 118 displays within discrete rectangular spaces, 120 and 122 respectively, the images A and B. Conduit 116 also relays and receives inputs and instructions between the window server 108 and screen 118.

As illustrated in FIG. 1, in response to a display command, images A and B appear in spaced apart rectangular spaces 120 and 122 respectively. While additional scene manipulation instruction may reposition rectangular spaces 120 and 122 within the screen 118, images A and B are not manipulatable within their respective spaces. FIGS. 2 and 3 illustrate a 2-D graphic system's response to a partial or complete occlusion of one rectangular space by another.

FIG. 2 is substantially similar to FIG. 1 except that in response to a scene manipulation instruction (SMI), rectangular space 222 is positioned with respect to rectangular space 220 such that rectangular space 222 now occludes the upper right corner of rectangular space 220. As illustrated in FIG. 2, responding to such SMI, List 214 now stores only data for the visual portion of the 2-D space display of 220. In this way, any SMI initiated within space 222 selects only the CGOs within space 222. In other words, a SMI initiated in portions of space 222 occluding portions of space 220 is only responsive to CGOs unique to space 222.

FIG. 3 is substantially similar to FIGS. 1 and 2 except that in response to a SMI, rectangular space 322 now totally eclipses space 320 (not shown). Responding to such SMI, List 314 stores only data for the visual portion of the 2-D space display of 322. As a result, the CGO's in space 320 are non-selectable by an immediately preceding SMI. In other words, any SMI initiated in space 322 selects only the CGO's unique to space 322. For the CGO's in space 320 to become selectable, a portion of space 320 must be visible on screen 318.

Generally, in the operation of traditional 3-dimensional (3-D) graphics systems, such 3-D systems employ a single computer graphics client. Generally, the single computer graphics client includes a plurality of application programs. Each application program is responsible for processing, interacting and manipulating a particular computer graphics object within a display space, such as a screen.

FIG. 4 illustrates a schematic flow chart of a 3-D graphic system 400. The system 400 includes a first application program (AP') 402 and a second application program (AP") 404. AP' 402 is ultimately responsible for image "A" appearing on screen 418 and A" 404 is ultimately responsible for image "B" appearing on screen 418. There is also a communication conduit 406 between AP' 402 and A" 404 the purpose of which will be described in greater detail below.

When a display command is initiated to display images A and B on screen 418, inputs, via conduits 408 and 410 from AP' 402 and AP" 404 respectively, are communicated to a server 412. Within the server 412, a List 414 is generated. List 414 contains discrete computer generated object data (CGO data) for respective application programs. In this example, the discrete computer generated object data relates to images A and B. The function of the List 414 within the server 412 is to maintain the proper spatial relationship between the computer generated objects, as in this example, images A and B appearing on screen 418, of the respective application programs.

Graphics generation instructions from the server 412 are relayed via conduit 416 to the screen 418 whereupon images A and B appear. Conduit 416 also relays and receives inputs and instructions between the server 412 and the screen 418.

As illustrated in FIG. 4, in response to a display command, images A and B appear on screen 418. Additional scene manipulation instructions may reposition A and B, including an instruction to merge A and B as illustrated in FIG. 5.

FIG. 5 is substantially similar to FIG. 4 except that in response to a scene manipulation instruction, images A and B are now merged. As is illustrated in FIG. 5, merger of images A and B result in an over-right of B with respect to A wherein both A and B are visible. In this case, the scene manipulation instruction was to move image B only such that image B merged with image A. This SMI was communicated via conduit 416 to server 412, which in turn communicated the SMI via conduits 408 and 410 to AP' 402 and AP" 404.

In order to process this command, AP' 402 and A" 404 communicate via conduit 406 between themselves. Communication between AP' 402 and A" 404 is required so that the SMI directed to image B, i.e., to alter the position of image B relative to image A, is processed by application program responsible for image B, i.e., A" 404.

As such, it is readily apparent that to correctly process SMIs, traditional 3-D graphic systems require the presence of a common data structure between application programs. The common data structure includes SMI reply methods. These SMI reply methods provide for the sorting and directing of SMIs between application programs and ultimately the processing of the SMI by the application program(s) responsible for the manipulated computer generate object (s).

While FIGS. 4 and 5 illustrate a 3-D graphic system having only two application programs, the complexity of 3-D graphic systems having ten, twenty or even one hundred application programs becomes apparent. However, as a result of such 3-D graphic system architecture, such 3-D systems have three distinct disadvantages.

First, as the number of application programs increases, the complexity of the communication between application programs and common data structure increases. As such, all SMI reply methods within the 3-D system are stored in computer memory albeit that only a fraction of the application programs and corresponding SMI reply methods may be required for a certain task. In other words, the operator is unable to select only those particular application programs required for a certain task thereby conserving computer memory. Such conventional computer graphics systems require all application programs and associated data structure be stored in computer memory. As a result, not only may the computing time for instructions increase, larger and more expensive computing systems may be required.

Second, the addition of an additional application programs to the computer graphics client is a time consuming and expensive undertaking. Third, the integration of two distinct 3-D systems is also a time consuming and expensive undertaking.

As will be appreciated by one skilled in the art, the second and third disadvantages result from the required linkages between application programs within the computer graphics client. The greater the number of application programs the greater the number of linkages between such application programs. Thus, referring back to the 3-D system illustrated in FIG. 4 and 5, if one were to attempt to add an application program to generate an image "C", such application program would have to be linked to AP' 402 and A" 404. In this way resulting set of communications between application programs would be: A–B, A–C, and C–B. Making this task even more formidable for the program attempting such linkage is that to successfully perform the same the programmer would have to have access to and be familiar with the behavior and data structure of AP' 402 and A" 404.

Additionally, as the source listing for such data structures generally are closely guarded by the 3-D software developer, a licensee of such 3-D software requiring the addition of an application program may be unable to perform such modification in-house. In this case, the linkage of the additional application program rests with the discretion of the developer and his hourly consulting rate.

SUMMARY OF THE INVENTION

Aware of the heretofore mentioned disadvantages of conventional 2-D and 3-D graphics systems, the inventors have discovered methods of interacting with computer graphics which avoid these and other disadvantages of conventional graphic systems. The present invention provides methods of interacting with computer graphics which includes generating a list wherein said list includes data of at least one computer generated object from a corresponding application program, and wherein at least one computer generated object of said list is associated with its corresponding application program, and generating a scene from the product of the list generating step, wherein said scene displays a computer generated object, and wherein a scene manipulation instruction specific to the computer generated object notifies the application program associated with the computer generated object manipulated by said scene manipulation instruction.

More particularly, as will be described in greater detail below, a user input instruction is transformed by a user interface process into a scene manipulation instruction. The scene manipulation instruction is associated with affected computer generated objects by an object identification process wherein an inquiry into the list returns the affected computer generated objects. The list is again interrogated by a application program identification process which results in a fully realized scene manipulation instruction. This scene manipulation instruction along with identification data for the affected computer generated object and the associated application programs are transformed into discrete messages which are communicated to the affected application programs.

The unique advantage of the present invention is that it is not necessary to construct a single, very large and complex computer graphics system to create and manage a large and complex collection of discrete computer graphic objects. A set of application programs, each managing a subset of the total available computer graphic objects, can provide the same visual representation of such a single very large and complex computer graphics system.

In other words, the present invention can support an arbitrary number of application programs, wherein each such application program is given the appearance that it has visual control of a multi-dimensional graphic object, and wherein each such application program is independent of the other. In this way, application programs may be developed independently of each other. The operator can create a visually integrated, arbitrarily complex multi-dimensional computer graphics scene by the invocation of an arbitrary collection of such application programs which may be manufactured by separate developers in independent time frames.

Additionally, as the present invention permits the application programs to function independently, the programmer may select only those application programs required for a particular task. In this way, a more judicious use of computer memory is provide which can obtain results similar to conventional computer graphic systems in generally less time with generally less consumption of computer memory.

Among other method steps used by the present invention, a unique method step of the present invention is the step of associating each computer graphics object with the application program responsible for such computer graphics object. In the present invention, unlike the part-time association of conventional 2-D systems, the association between computer graphics objects and application programs continues regardless of the position of one computer generated object to another. Key to the associating step is the generation of a list. The list, as will be described in greater detail, includes computer generated object data and corresponding application program identifiers. The list also provides a mechanism whereby operator interactions with the scene can be communicated back to the single application program responsible for the creation of that object.

Another unique method step of the present invention is the step of notifying the application programs about user input instructions affecting computer generated objects specific to such application programs.

The present invention also provides direct operator interaction with the collection of computer generated objects in the scene by the uniform application of visualization operations to all objects maintained in the list. In this way, the collection of computer generated objects in the scene may be manipulated as a whole for purposes of altering the dimensional viewing representation of such computer generated objects without the necessity for any application program to have to be concerned about the visual manipulation of the collection of objects in the scene.

DETAILED DESCRIPTION OF THE PREFERRED EMBODIMENT

The following terms will be used throughout this description and shall have the meaning associated therewith:

Computer Generated Object (CGO): a computer data structure containing values which describe a geometry and a display attribute.

Application Program (AP): a computer process, task, thread of control or job, such as for example a UNIX process or UMS job.

Association: an identification process whereby a computer data structure, such as an application program identifier, identifies an application program of a CGO.

Application Program Identifier (APID): a unique computer data structure which correlates to a unique application program.

List: a collection of data for at least one CGO and a application program identifier corresponding to the application program responsible for said CGO data.

Scene: a display of the geometric attributes of at least one CGO wherein the displayed CGO coincides with the CGO data contained in the List.

Geometric Attributes: include, but are not limited to, color, transparency, shininess, line style or fill style.

Scene Manipulation Instruction (SMI): a command to edit, alter or modify the scene, and furthermore, wherein said command edits, alters or modifies at least one CGO or a scene depicting at least one CGO.

Figure 1:
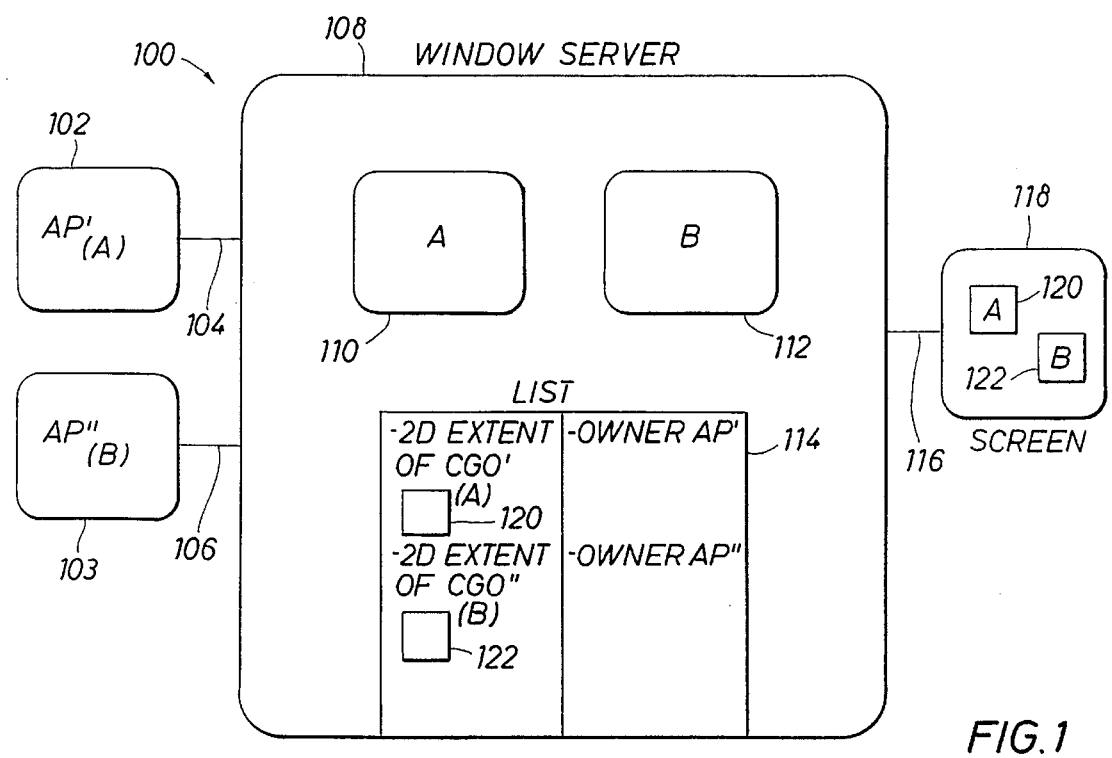
FIG. 1 illustrates a schematic flow chart of a 2-D window graphics system.
Figure 2:
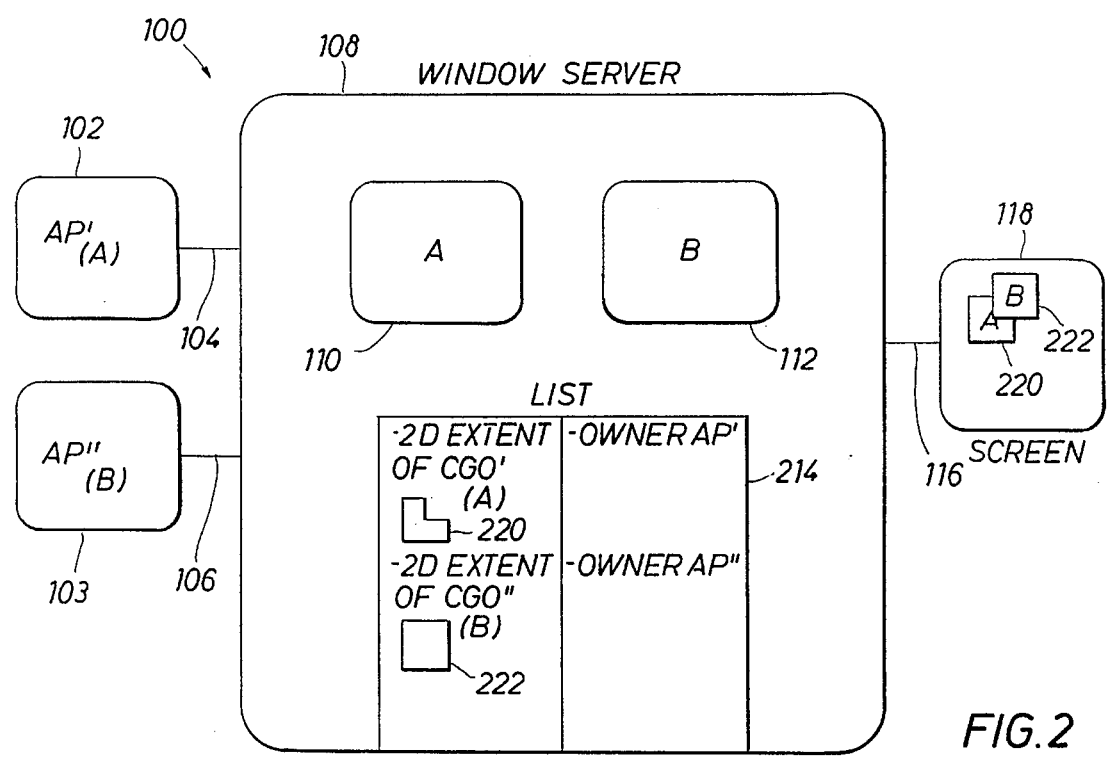
FIG. 2 is a schematic flow chart similar to FIG. 1.
Figure 3:
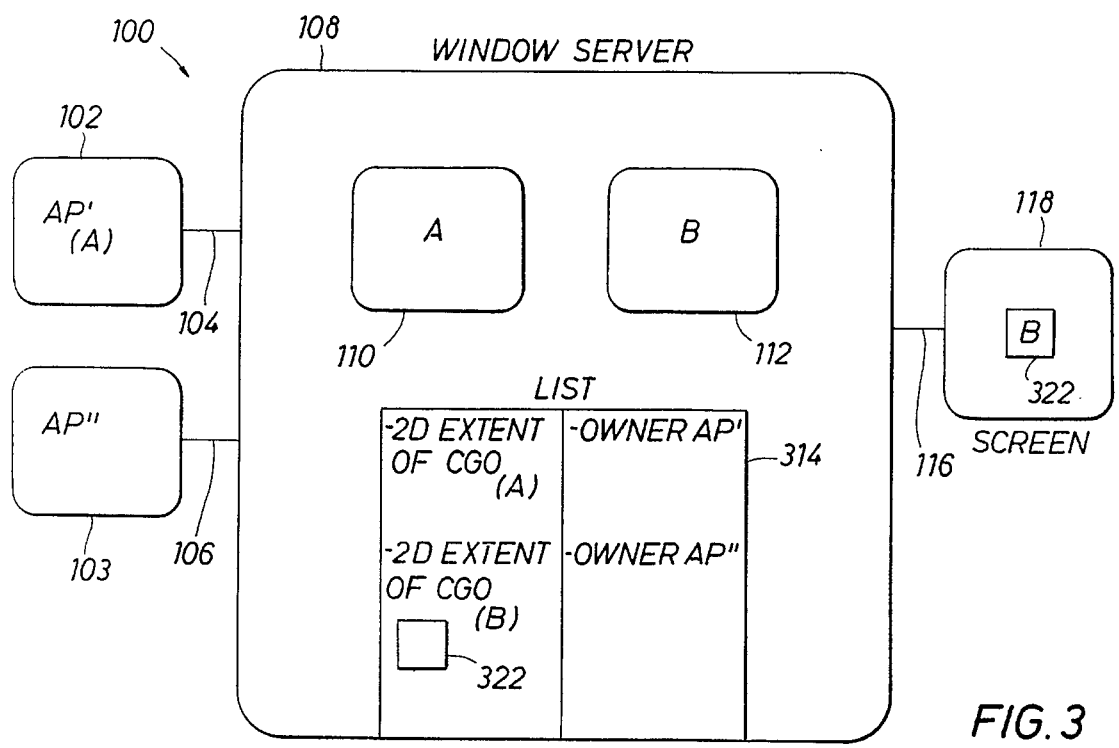
FIG. 3 is a schematic flow chart similar to FIG. 1.
Figure 4:
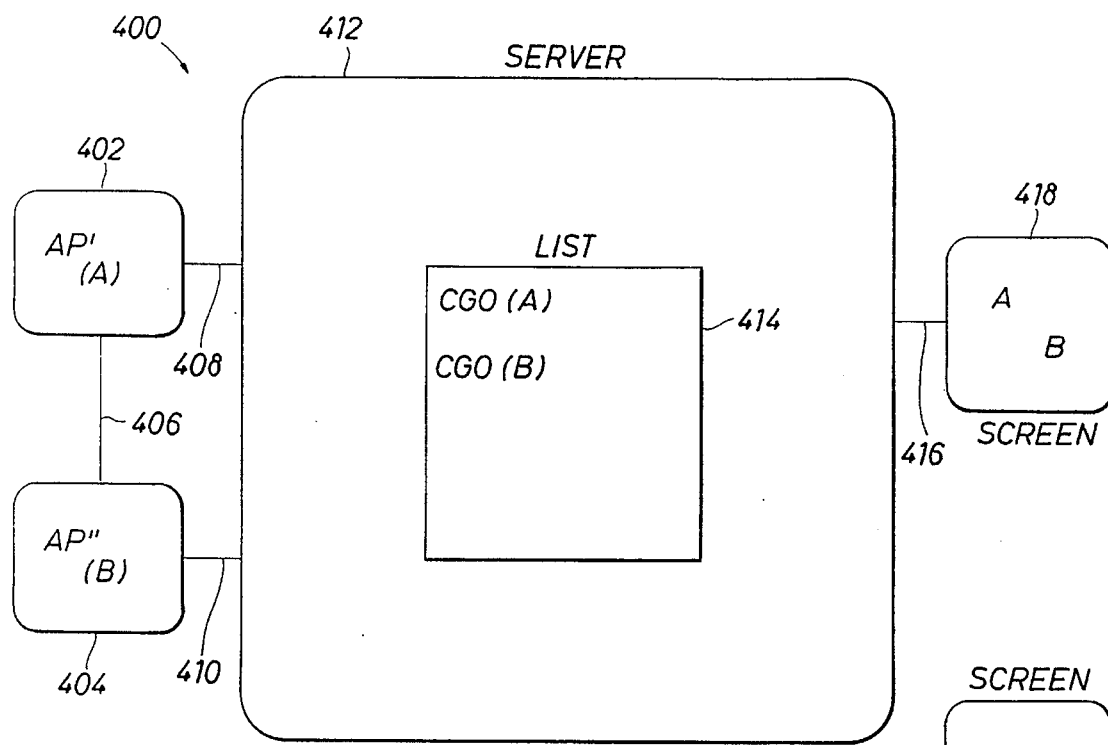
FIG. 4 illustrates a schematic flow chart of a 3-D graphic system.
Figure 5:
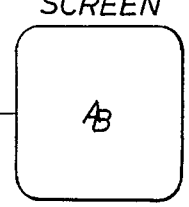
FIG. 5 is a view of a portion of FIG. 4.
Figure 6:
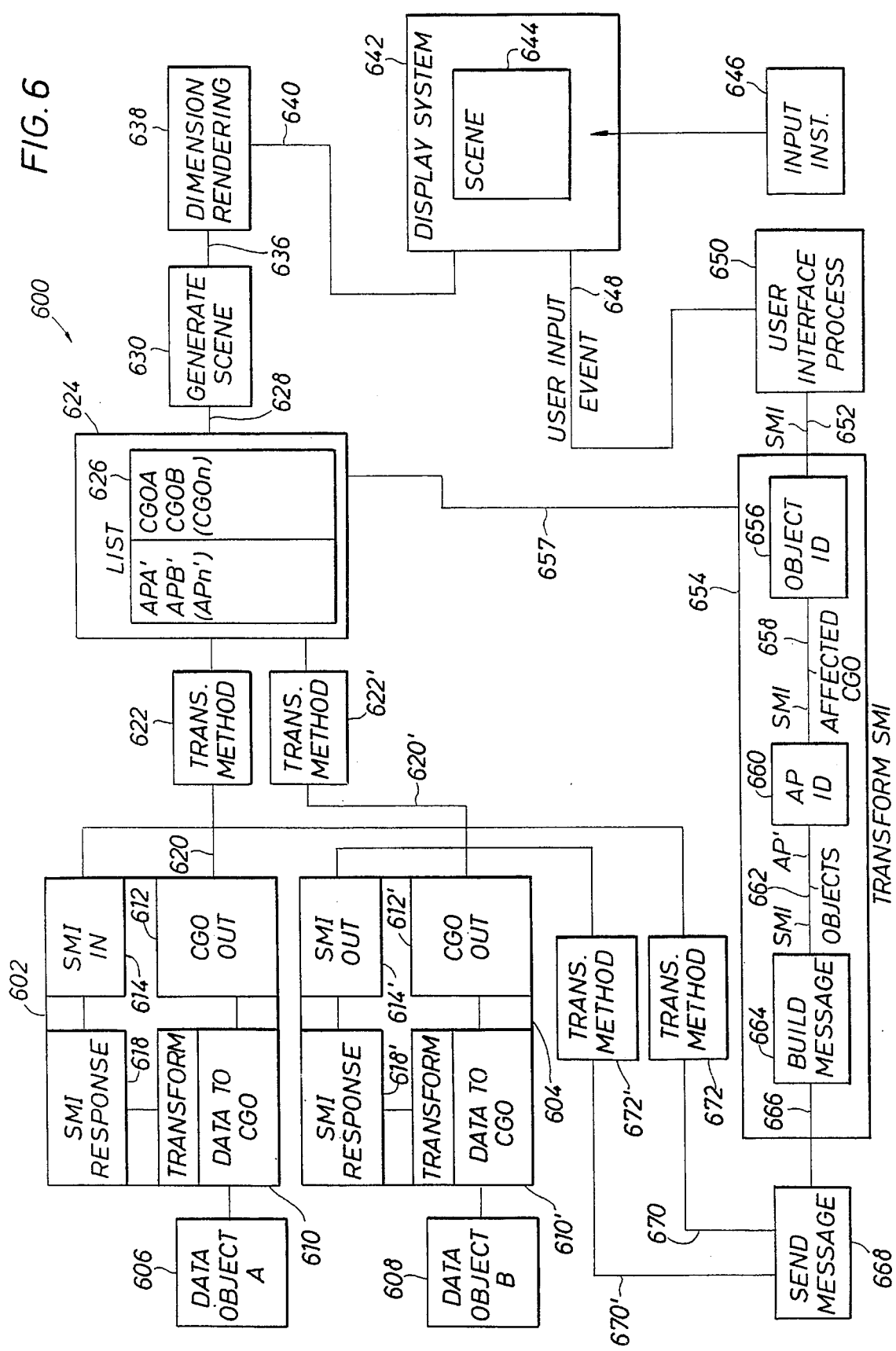
FIG. 6 is a schematic flow chart of the present invention.

Referring again to the drawings, and more particularly to FIG. 6, there is shown graphics interaction method 600 in accordance with the present invention. As illustrated in FIG. 6, the graphics interaction method 600 includes application program A (APA) 602 and application program B (APB) 604. It will be understood by those skilled in the art that the present invention may suitably function with a single application program or a plurality of application programs. But for convenience, the present invention is illustrated and described herein with reference to two application programs.

Data objects A 606 and data objects B 608 are input to APA 602 and APB 604 respectively. Data objects provide information, generally in a digitized format, for processing by an appropriate application program. For example, if data objects A consisted of seismic data and data objects B consisted of well log data, an appropriate application program (APA) for processing seismic data would include a seismic interpretation program. An appropriate application program (APB) for processing well log data would include a well log interpretation program.

Once the data objects A 606 and data objects B 608 are received by APA 602 and APB 604 respectively, the data objects are transformed to computer generated object data A and B (CGOA and CGOB). The process of transforming the data objects A 606 by APA 602 is represented by box 610. The process of transforming the data objects B 608 by APB 604 is represented by box 610'. CGO data from 610 and 610' are input to corresponding CGO output processes represented by boxes 612 and 612' respectively.

Output from the CGO output processes 612 and 612' respectively is transmitted, using transmission methods 622 and 622', by conduits 620 and 620' to a List generating process 624. Such transmission methods 622 and 622' may be inter-process communication methods such as POSIX message queue which is known by those skilled in the art to be standard inter-process communication methods.

The List generating process 624 generates a List 626. List 626 stores computer generated object data A and B (CGOA and CGOB) and the corresponding application program identifier for application program A and B. The application program identifier for application program A and B are represented in List 626 by notations APA' and APB' respectively. As mentioned previously, the present invention may include a plurality of application programs in addition to APA and APB. The notations (APn') and (CGOn) represent the application program identifier and computer generated object data from such additional application programs which could be stored in List 626.

Conduit 628 then provides the computer generated object data A and B to a scene generation process 630. The scene generation process 630 preferably creates a scene in response to the all computer generated object data stored in List 626.

Conduit 636 provides output from the scene generation process 630, i.e., the scene, to a dimension rendering process 638. For purposes of the present invention, the dimension rendering process is preferably a 3-D dimension rendering process. The dimension rendering process 638 transforms the scene into instructions recognizable by a computer display system. Such dimension rendering process instructions may further integrate all computer generated object data present in the scene such that the computer display system may display an integrated visual scene. The computer display system instructions are then input via conduit 640 to a computer display system 642.

Those skilled in the art will appreciate the requirements for the computer display system 642. However, generally, an appropriate computer display system may include an operating system (not shown) and appropriate operating system software, a display means, such as screen 644 for displaying the scene, and an input instruction means 646, such as a mouse or light pen, for preferably imputing user instructions to modify, alter or edit the displayed scene.

Once displayed, the scene may now be modified, altered or edited, preferably by an input instruction selected by a user (user input event). As previously discussed the user input event is communicated to the computer display system 642 by the input instruction means 646. The computer display system 642 communicates, via conduit 648, the user input event to a user interface process 650.

Utilizing user interface methods, the user interface process 650 transforms the user input event into a scene manipulation instruction (SMI). The preferred user interface methods for use with the present are MOTIF user interface methods, a product of the Open Software Foundation.

The SMI from the user interface process 650 is communicated, via conduit 652, to a SMI transformation process 654. As will be discussed in greater detail below, the SMI transformation process 654 ultimately converts the SMI into a message processable by the application programs. Ultimately, in response to such message, one or more affected application programs create new computer generated object data responsive to the user input event.

The SMI transformation process 654 includes an object identification process 656. Using the SMI input to the SMI transformation process 654, the object identification process 656 interrogates the List 626 and identifies the computer generated object data relative to or affected by the user input instruction. In other words, if the user input instruction was to merge B with A by moving only B, the object identification process 656 would interrogate the List 626, via conduit 657, at which time the computer generated object data relative to image B would be identified. The SMI and identification data for the affected computer generated object are communicated, via conduit 658, to an application program identification process 660.

Using the identification data for the affected computer generated objects, the application program identification process 660 interrogates the List 626, via conduit 657, and identifies application program identifiers (APA' and APB'). The application program identifiers identified by process 660 correspond the application programs of the affected computer generated objects. In this way, the application program identification process can be said to create an association between an affected computer generated object and the application program of the affected computer generated object.

The SMI, the identification data for the affected computer generated object and the application program identifiers associated with the affected computer generated objects are communicated, via conduit 662 to a message building process 664. The message building process 664 transforms the input data from the application identification process 660 into discrete messages or sets of instructions. These messages are ultimately routed to and are recognizable by the application programs which correspond to the identified application program identifiers.

Once constructed, these discrete messages are communicated, via conduit 666 to a message sending process 668. The message sending process 668 directs each such message to the appropriate application program.

In the method illustrated in FIG. 6, messages responsive to the application program 602 are communicated, via conduit 670, to application program 602. Messages responsive to the application program 604 are communicated, via conduit 670' to application program 604. As previously discussed, messages are relayed between processes by conventional inter-process communication methods. For conduit 670, an inter-process communication method 672, such as POSIX message queues, is preferred For conduit 670' an inter-process communication method 672', such as POSIX message queues, is preferred. However, it will be understood by one skilled in the art that communication between process may be accomplished by other conventional inter-process communication methods.

Messages via conduits 670 and 670' are communicated to scene manipulation input processes 614 and 614' of application programs 602 and 604 respectively. Output from input processes 614 and 614' is communicated to the scene manipulation response processes 618 and 618'. Responsive to and dependent upon the messages imputed by conduits 670 and 670', processes 618 and 618' may cause the retransmission of a new computer generated object from processes 610 and 610' to corresponding computer generated object output processes 612 and 612'.

The computer generated contents of the List are updated to reflect the new computer generated objects input thereto via conduits 620 and 620'. Conduit 628 provides the new computer generated data to the scene generation process 630 which, via processes previously described, updates the scene responsive to the user input event.

It will be clear that the present invention is well adapted to carry out the objects and attain the ends and advantages mentioned as well as those inherent therein. While a presently preferred embodiment of the invention has been described for purposes of this disclosure, changes may be made which will readily suggest themselves to those skilled in the art and which are encompassed within the spirit of the invention disclosed and as defined in the appended claims.

What is claimed is:

1. A method of interacting with computer graphics comprising:

generating and storing in a data storage medium a list which includes data related to computer generated objects from one or more application programs and which objects are to be included in a computer graphics scene display and an application program identifier to identify the application program which is the source of each computer generated object included in the list;

generating a single screen display in a computer display means in response to the list;

manipulating an object in the scene display with a user command;

generating at least one interrogation command in response to said manipulation and interrogating said list to retrieve data relating to each object affected by the manipulation and an application program identifier related to each application program which is the source of an object affected by the manipulation;

transmitting to each application program which is the source of an object affected by the manipulation, data related to the objects of which the program is the source and information regarding the manipulation; and detecting such transmission by the application program which is the source of an object affected by the manipulation and performing such additional steps as are required by the manipulation.

2. The method of claim 1 further comprising:

determining within an application program which detects the transmission whether further scene updating is required by the detected transmission; and generating such modifications in response to the detected transmission if an application program determines that such updating is required.

3. An interactive computer graphics system comprising:

means for generating a list which includes data related to computer generated objects from one or more application programs and which objects are to be included in a single computer graphics scene display and an application program identifier to identify the application program which is the source of each computer generated object included in the list;

a data storage medium for storing such list;

a computer display means for displaying said single scene in response to the list;

means for manipulating an object in the scene display in response to a user command;

means for generating at least one interrogation command in response to said manipulation and interrogating said list to retrieve data relating to each object affected by the manipulation and an application program identifier related to each application program which is the source of an object affected by the manipulation;

means for transmitting to each application program which is the source of an object affected by the manipulation, data related to the objects of which the program is the source and information regarding the manipulation; and means for detecting such transmission by the application program which is the source of an object affected by the manipulation and performing such additional steps as are required by the manipulation.

4. The system of claim 3 further comprising:

means for determining within an application program whether further scene updating is required by the detected transmission; and means for generating such modifications in response to the detected transmission if an application program determines that such updating is required.

5. A method of interacting with computer graphics comprising:

transforming data objects into computer generated objects by utilizing application programs;

transmitting the computer generated objects to a list generating process;

generating and storing in a data storage medium a list which includes data related to the computer generated objects from one or more application programs and which objects are to be included in a computer graphics scene display and an application program identifier to identify the application program which is the source of each computer generated object included in the list;

generating a scene in response to the list;

transforming the scene into instructions recognizable by a computer display system by utilizing a dimension rendering process;

displaying the instructions on a computer display means;

manipulating an object in the scene display with a user command;

generating at least one interrogation command in response to said manipulation and interrogating said list to retrieve data relating to each object affected by the manipulation and an application program identifier related to each application program which is the source of an object affected by the manipulation;

transmitting to each application program which is the source of an object affected by the manipulation, data related to the objects of which the program is the source and information regarding the manipulation;

receiving such transmission by the application program which is the source of an object affected by the manipulation; and peforming such additional steps as are required by the manipulation.

6. The method of claim 5 further comprising:

determining within an application program which receives the transmission whether further scene updating is required by the received transmission; and generating such modifications in response to the received transmission if an application program determines that such updating is requried.

7. An interactive computer graphics system comprising:

means for transforming data objects into computer generated objects;

means for transmitting the computer generated objects to a means for generating a list;

means for generating list which includes data related to the computer generated objects from one or more application programs and which objects are to be included in a computer graphics scene display and an application program identifier to identify the application program which is the source of each computer generated object included in the list;

a data storage medium for storing said list;

means for generating a scene in response to the list;

means for transforming the scene into instructions recognizable by a computer display system by utilizing a dimension rendering process;

a computer display means for displaying said single scene in response to the list;

means for manipulating an object in the scene display with a user command;

means for generating at least one interrogation command in response to said manipulation and interrogating said list to retrieve data relating to each object affected by the manipulation and an application program identifier related to each application program which is the source of an object affected by the manipulation;

means for transmitting to each application program which is the source of an object affected by the manipulation, data related to the objects of which the program is the source and information regarding the manipulation;

means for receiving such transmission by the application program which is the source of an object affected by the manipulation; and means for peforming such additional steps as are required by the manipulation.

8. The system of claim 7 further comprising:

determining within an application program which receives the transmission whether further scene updating is required by the received transmission; and generating such modifications in response to the received transmission if an application program determines that such updating is requried.

* * * * *